US012779263B2

(12) United States Patent
Ghamdi

(10) Patent No.: US 12,779,263 B2
(45) Date of Patent: Nov. 3, 2026

(54) UNMANNED FIRE HOSE LOADING SYSTEM

(71) Applicant: SAUDI ARABIAN OIL COMPANY, Dhahran (SA)

(72) Inventor: Majed I. Ghamdi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 257 days.

(21) Appl. No.: 18/751,826

(22) Filed: Jun. 24, 2024

(65) Prior Publication Data

US 2025/0387654 A1 Dec. 25, 2025

(51) Int. Cl.
*A62C 33/04* (2006.01)

(52) U.S. Cl.
CPC .................................... *A62C 33/04* (2013.01)

(58) Field of Classification Search
CPC ......... A62C 33/04; A62C 33/00; A62C 31/00; A62C 31/24; A62C 31/28; A62C 37/00; A62C 27/00; B60P 3/2265; B60P 3/035; B60P 1/5438; B60P 1/5423; B60P 1/5457
USPC ........................................................... 414/467
See application file for complete search history.

(56) References Cited

U.S. PATENT DOCUMENTS

| | | | | | |
|---|---|---|---|---|---|
| 4,313,707 | A * | 2/1982 | Bingman | B65F 3/08 414/544 |
| 6,006,841 | A * | 12/1999 | Hunke | A62C 33/00 248/90 |
| 7,976,090 | B2 | 7/2011 | Sandness et al. | |
| 9,884,576 | B1 * | 2/2018 | McLoughlin | B60P 1/438 |
| 10,441,831 | B2 | 10/2019 | Lackore, Jr. et al. | |
| 2014/0291371 | A1 * | 10/2014 | Halley | A62C 27/00 224/522 |
| 2015/0041515 | A1 * | 2/2015 | Hut | B65H 51/32 226/176 |

OTHER PUBLICATIONS https://www.thehosemule.com/products-overview; downloaded Mar. 2024, Baker Fabrication LLC 2012.

* cited by examiner

*Primary Examiner* — Glenn F Myers
(74) *Attorney, Agent, or Firm* — Vorys, Sater, Seymour and Pease LLP

(57) ABSTRACT

A loading system is disclosed comprising a frame mountable to a hose bed of a firetruck and including a track, a rail movable along the track, and a hose catch operatively coupled to the rail. The rail comprises a body and an arm pivotably attached to the body and transitionable between a gripping state, where the arm grippingly engages a firehose and thereby enables the hose catch to move the firehose within the frame, and a released state, where the arm releases the firehose and thereby enables the hose catch to move relative to the firehose.

20 Claims, 6 Drawing Sheets

UNMANNED FIRE HOSE LOADING SYSTEM

FIELD OF THE DISCLOSURE

The present disclosure relates generally to fire trucks and, more particularly, to a loading system for loading firehoses into a bed of a firetruck.

BACKGROUND OF THE DISCLOSURE

Fire trucks, also known as fire engines, play a critical role in the rapid and effective suppression of fires in various environments. These vehicles typically carry an assortment of equipment, such as hoses, to facilitate the extinguishment of fires in a variety of settings, such as residential areas, industrial complexes, and wildland environments.

One essential component of a fire truck is the hose bed, which serves as the storage area for firehoses when not in use. Traditional hose beds are typically located on the rear of the vehicle and consist of compartments where the hoses are stacked.

It is well known in the field of firefighting that these fire hoses are difficult to recover and reload into the fire engine bed after the fire is extinguished. Flexible hoses of this type are made up of sections which are provided with hose couplings at both ends. The couplings are made of metal and cannot be compressed like the hose itself. In typical day-to-day practice, several firefighters are necessary to recover and replace the hose, depending on the weight and length of the hose.

Currently, a team of firefighters, such as two or three firefighters, either manually roll or fold up the flexible hose to load the firehose into the hose bed. During this loading process, at least one of the firefighters is required to climb up onto the fire truck to load the hose into the hose bed, which requires a lot of time and effort, and runs the risk of the firefighters falling off the truck or injuring their back.

Accordingly, there is a need for a hose loading system that facilitates the loading of fire hoses that will enhance the firefighter's safety, as well as reduce the time and effort required to reload the firehose into the bed of the firetruck.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In various embodiments, a loading system is disclosed including a frame mountable to a hose bed of a firetruck and including a track, a rail movable along the track, and a hose catch operatively coupled to the rail and comprising a body an arm pivotably attached to the body and transitionable between a gripping state, where the arm grippingly engages a firehose and thereby enables the hose catch to move the firehose within the frame, and a released state, where the arm releases the firehose and thereby enables the hose catch to move relative to the firehose.

In various embodiments, a loading system is disclosed including a frame mountable to a hose bed of a firetruck and including a track, a rail movable along the track and comprising a hose catch, configurable between a gripping state in which the hose catch grippingly engages a firehose and thereby enables the hose catch to move the firehose within the frame and a released state in which the arm releases the firehose and thereby enables the hose catch to move relative to the firehose. The rail is movable along the track through loading strokes in which the hose catch is in the gripping state return strokes in which the hose catch is in the released state.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
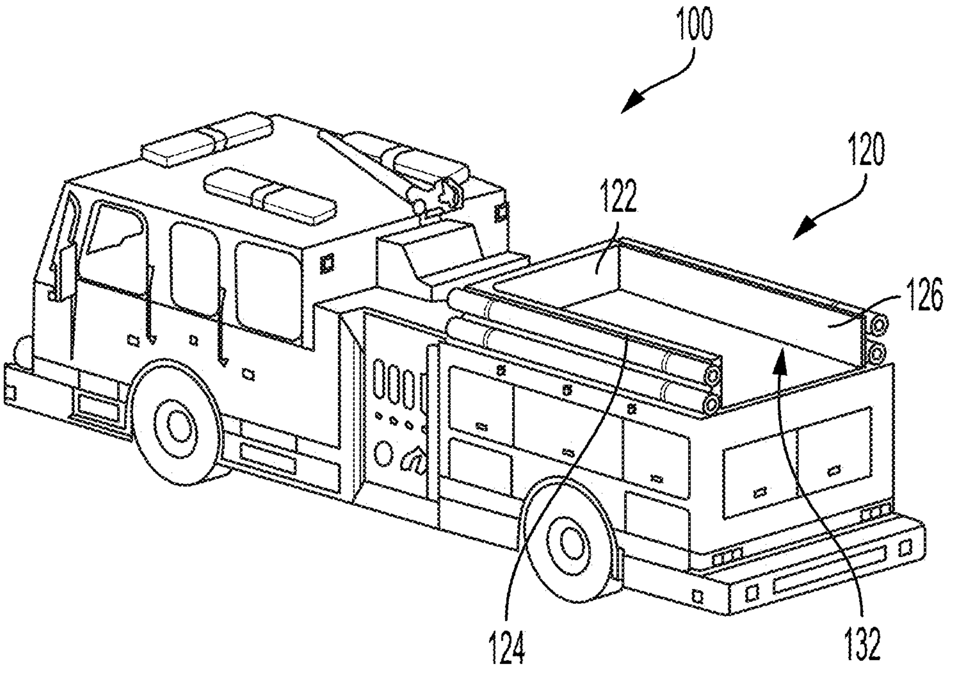
FIG. 1 is an example firetruck that may incorporate the principles of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to fire trucks and, more particularly, to a loading system for loading a firehose onto a bed of a firetruck. The embodiments disclosed herein describe an unmanned fire hose loading system that can be installed in the bed of a fire truck, and is operable to load a deployed fire hose perfectly without any (or minimal) intervention from the firefighters. This system will enhance the safety of the firefighters by mitigating incidents of falling from the bed of the fire truck and/or back injuries.

FIG. 1 is an isometric view of an example firetruck 100 that may incorporate the principles of the present disclosure. As illustrated, the firetruck 100 includes, among other things, a hose bed 120 sized to receive and store one or more lengths of hose therewithin. The hose bed 120 includes a front wall 122, a rear end 132 opposite the front wall, and opposing first and second lateral bed walls 124 and 126 extending between the front wall 122 and the rear end 132. The first and second lateral bed walls 124, 126 are laterally offset from each other, and a bed base 128 extends generally horizontally between the front wall 122 and the rear end 132, and further between the first and second lateral bed walls 124, 126. The bed base 128 defines the hose bed 120 into which the hoses can be loaded and stored.

Figure 2:
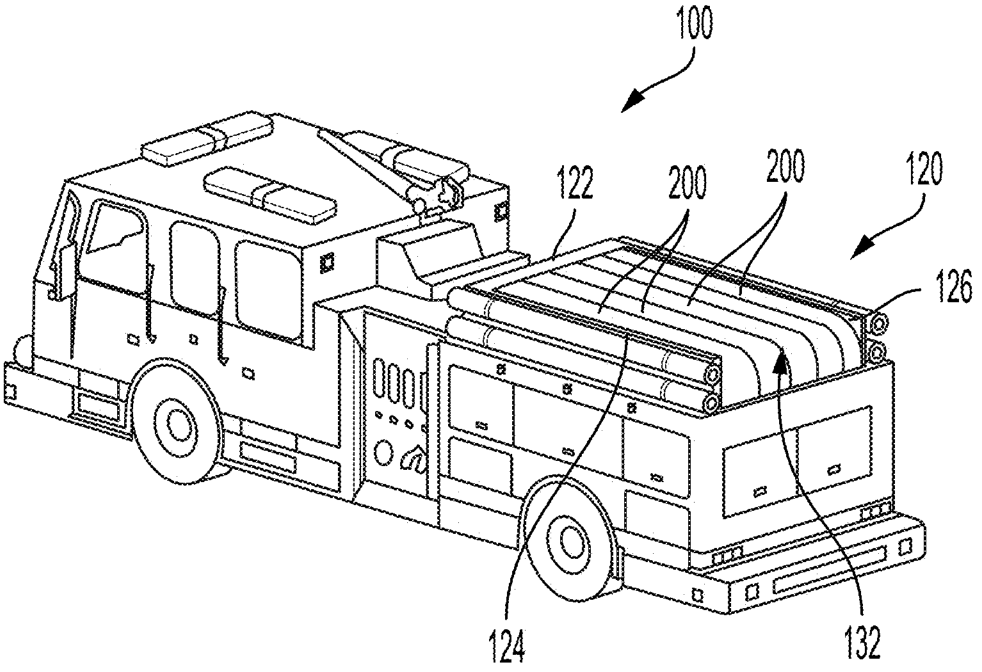
FIG. 2 is the firetruck of FIG. 1 with a firehose positioned in the hose bed, according to at least one aspect of the present disclosure.

FIG. 2 depicts the firetruck 100 of FIG. 1 with one or more firehoses 200 loaded in the hose bed 120. The firehoses 200 are loaded into the hose bed 120 such that each firehose 200 lays flat upon themselves in a serpentine manner. For example, a first section of one of the firehoses 200 is extended from the rear end 132 of the hose bed 120 to the front wall 122 and laid onto the bed base 128. The firehose 200 is then bent upon itself such that a second section of the firehose 200 extending from the first section of the firehose 200 reversed course and extends from the front wall 122 toward the rear side 132 and is laid on top of the first section of the firehose 200. This process is then repeated until the entirety of the firehose 200 is stacked vertically upon itself and stored within the hose bed 120. This process can then be repeated for multiple firehoses to be stored in the hose bed 120 of the firetruck 200 and arranged laterally adjacent one another.

The aforementioned loading process is typically performed manually by a team of firefighters, which requires a lot of time and effort and could lead to injuries to the firefighters. According to embodiments of the present disclosure, a loading system is disclosed for loading firehouses into the hose bed of the firetruck.

Figure 3:
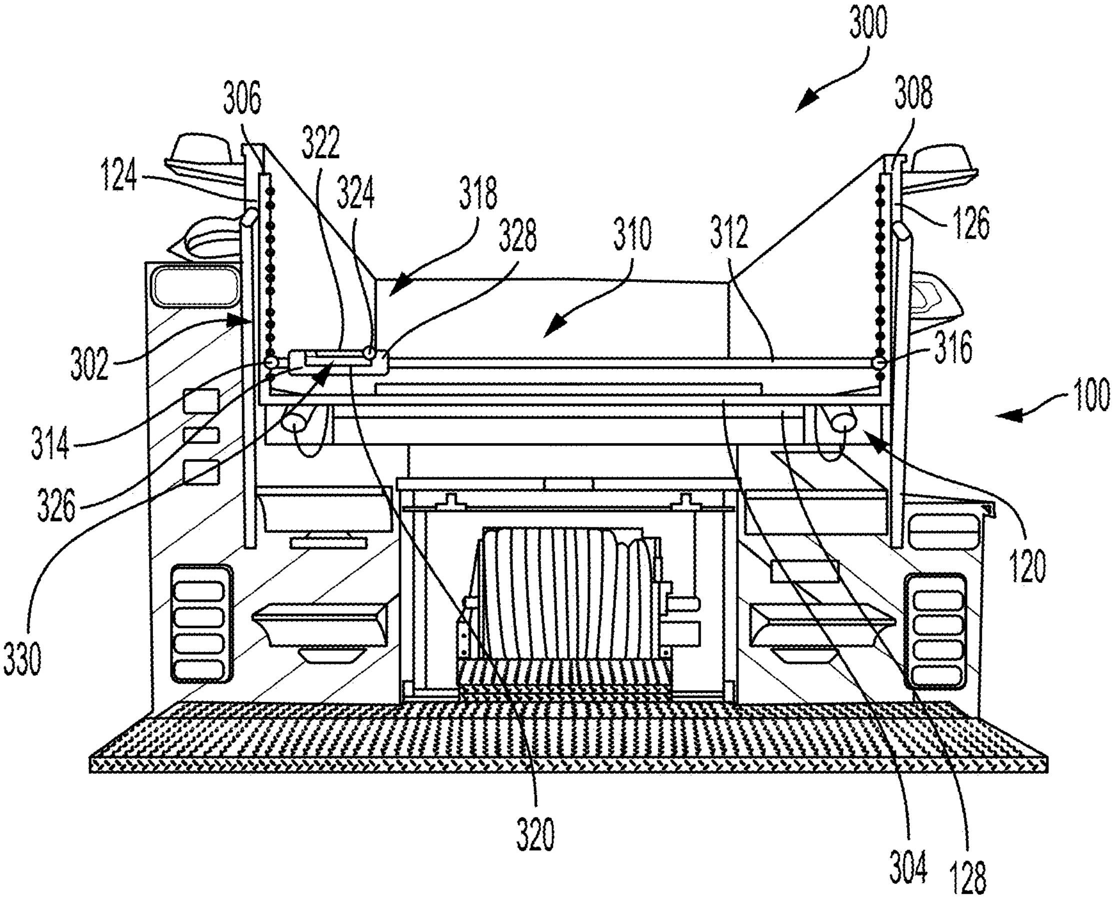
FIG. 3 is a rear side view of an example loading system mounted in the hose bed of the firetruck of FIG. 1, according to at least one aspect of the present disclosure.
Figure 4:
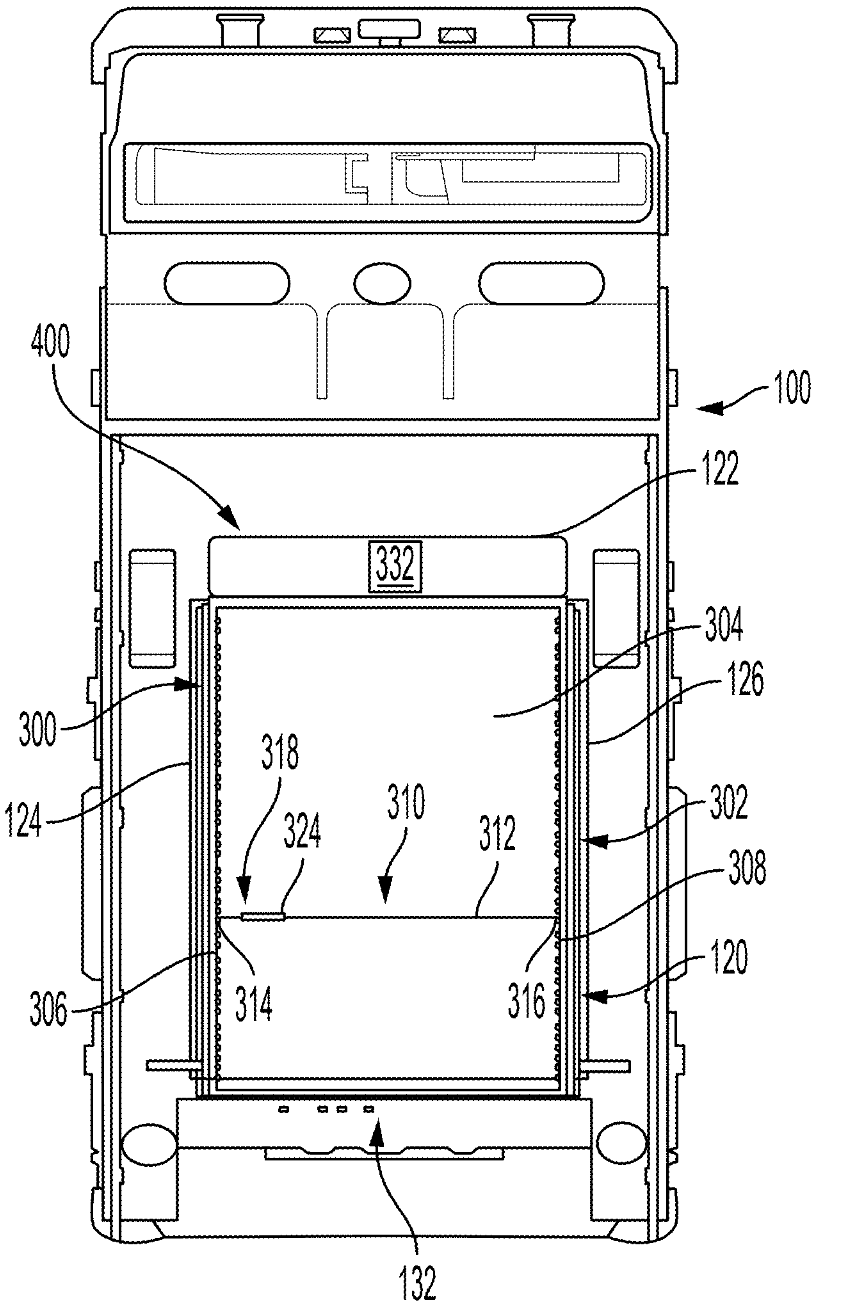
FIG. 4 is a top-down view of the loading system of FIG. 3, according to at least one aspect of the present disclosure.

Referring to FIGS. 3 and 4, illustrated is an example loading system 300 in accordance with the principles of the present disclosure. As illustrated, the loading system 300 includes a frame 302 comprising a frame base 304, a first frame wall 306 extending vertically from the base 304, and a second frame wall 308 opposite the first frame wall 306 and extending vertically from the base 304. The frame 302 is sized and dimensioned to fit within the hose bed 120 such that the frame base 304 sits, or rests, upon the bed base 128, the first frame wall 306 confronts (is arranged adjacent to) the first lateral bed wall 124, and the second frame wall 308 confronts (is arranged adjacent to) the second lateral bed wall 126.

In one aspect, the frame 302 is removably mountable to the hose bed 120. For example, the frame 302 may be mounted to the hose bed 120 using one or more mechanical fasteners including, but not limited to, nuts, bolts, latches, snap connections, locks, or combinations thereof. In such embodiments, the frame base 304 is mechanically coupled to the bed base 128, the first frame wall 306 is mechanically coupled to the first lateral bed wall 124, and/or the second frame wall 308 is mechanically coupled to the second lateral bed wall 126. In other aspects, or in addition thereto, the frame 302 may be press-fit into the hose bed 120. In yet other embodiments, or in addition to the foregoing, the frame 302 may be permanently mounted in the hose bed 120 or coupled to the hose bed 120 using one or more magnets or an adhesive.

The loading system 300 further includes a loading track 310 for loading a firehose into the frame 302. As illustrated, the loading track 310 includes a rail 312 and a hose catch 318 coupled to the rail 312. The rail 312 includes a first end 314 movably coupled to the first frame wall 306 and a second end 316 movably coupled to the second frame wall 308. The hose catch 318 is movably coupled to the rail 312 to allow the hose catch 318 to move laterally along the rail 312 into various loading positions between the first and second frame walls 306, 308, such as a first lateral loading position adjacent the first frame wall 306 (as shown in FIGS. 3 and 4), a second lateral loading position adjacent the second frame wall 308, or a plurality of intermediate loading positions in between the first and second lateral loading positions. In some embodiments, the catch 318 is manually movable along the rail 312 into the various loading positions. In other embodiments, the loading system 300 comprises a catch drive system, which could include a motor-driven system comprising a motor, to drive the catch 318 along the rail 312 into the various loading positions.

The hose catch 318 includes a body 320 and an arm 322 pivotably coupled to the body 320 at a pivot 324 such that the arm 322 is rotatable relative to the body 320 between an open position and a closed position. In one aspect, the arm 322 is movable between the open and closed positions with an arm drive system, which could include a motor-driven system comprising a motor. In other embodiments, the arm drive system may comprise a magnet-driven system comprising a first magnet arranged on the body and a second magnet arranged on the arm. In one aspect, the arm 322 is automatically movable between the open and closed positions using the arm drive system. In other aspects, the arm 322 is manually movable between the open and closed positions using the arm drive system.

The hose catch 318 provides and otherwise defines an opening or space 330 sized to receive a firehouse to be loaded into the frame 302. More specifically, when the arm 322 is in the closed position, the body 302 and the arm 322 cooperatively define an opening 330. When the arm 322 is in the open position, the hose catch 318 can receive a section of a hose (e.g., the firehose 200 of FIG. 2) within the opening 330. When the arm 322 transitions to the closed position, however, the hose may be captured within the hose catch 318 and, more particularly, within the opening 330.

As illustrated, the body 320 includes a first sidewall or "stop" 326 on a first lateral end thereof and a second sidewall or "stop" 328 on a second lateral end opposite the first end. The first and second stops 326, 328 cooperatively function to maintain a lateral position of the firehose within the opening 330. In one aspect, the opening 330 may exhibit a width (e.g. distance between the first and second stops 326, 328) of about 3 inches to accommodate a 3-inch firehose. In other aspects, the width of the opening 330 may be about 5 inches to accommodate a 5-inch firehose. In yet other aspects, the width of the opening 330 may be about 8 inches or about 12 inches to accommodate an 8-inch firehose or a 12-inch firehose, respectively. A person having ordinary skill in the art will understand that the width of the opening 330 may be defined to accommodate any desired hose size.

With the arm 322 in the closed position, the hose catch 318 may be movable (transitionable) between a first or "released" state and a second or "gripping" state. In the gripping state, the arm 322 may be clamped down onto a portion of firehose positioned within the opening 330, thus enabling the hose catch 318 to grippingly engage and move the firehouse within the frame 302 of the loading system 300. In the released state, however, the arm 322 is rotated or moved (pivoted) away from the body 320 such that the arm 322 does not engage the firehose, but the firehose remains laterally positioned between the first stop 326 and the second stop 328 of the body 320 within the opening 330. Accordingly, in the released state, the hose catch 318 is moveable relative to the firehose, such as toward and away from the front wall 122 (FIGS. 1 and 2) of the hose bed 120 (FIGS. 1 and 2), while the firehose is maintained between the first stop 326 and the second stop 328 in the opening 330.

The loading system 300 further includes a first track coupled to (provided on) the first frame wall 306 and a second track coupled to (provided on) the second frame wall 308. The first track is sized to receive the first end 314 of the rail 312 and the second track is sized to receive the second end 316 of the rail 312. The first and second tracks co-operatively enable the loading track 310 to move along a loading path within the frame 302 to load the firehose therein, as will be described in more detail below.

With specific reference to FIG. 4, the loading system 300 further includes loading track drive system 400 operable to drive the first end 314 of the rail 312 along the first track and the second end 316 of the rail 312 along the second track. In one aspect, the loading track drive system 400 comprises a first drive system to drive the first end 314 of the rail 312 along the first track and a second drive system to drive the second end of the rail 316 along the second track. In some aspects, the loading track drive system 400 comprises a common drive system that drives both the first and second ends 314, 316 along the first and second tracks, respectively. In one aspect, the loading track drive system 400 comprises a pulley-drive system comprising one or more cables and pulleys. In other aspects, the loading track drive system may comprise a gear-drive system comprising one or more inter-meshed gears and motors. In yet other aspects, the loading track drive system may comprise a motor-driven system including one or more motors or servos.

In some aspects, the loading track drive system 400 may be powered by a local power source. In at least one embodiment, for example, the power source may comprise the engine of the firetruck. In other embodiments, however, the power source may comprise one or more batteries or fuel cells. In one aspect, the loading system 300 comprises a master drive system that comprises the arm drive system, the catch drive system, and the loading track drive system 400.

In some embodiments, the loading system 300 may further include a computer system 332 (see FIG. 4) operable to control various operations performed by the loading system 300. In at least one embodiment, the computer system 332 may be in communication with the loading track drive system 400 and may be configured to control operation thereof to move the rail 312 horizontally between the front wall 122 and the rear end 132. In one aspect, the computer system 332 comprises a control circuit, but could alternatively comprise a computer. In one aspect, the computer system 332 comprises a processor and a memory storing computer-readable instructions that, when executed by the processor, cause the loading system 300 to perform a variety of functions. In some embodiments, the computer system 332 may communicate with various user interfaces and sensors described elsewhere to receive inputs therefrom, as well as the various drive systems described elsewhere herein to control their functionality according to the received inputs, as will be described herein.

Figure 5:
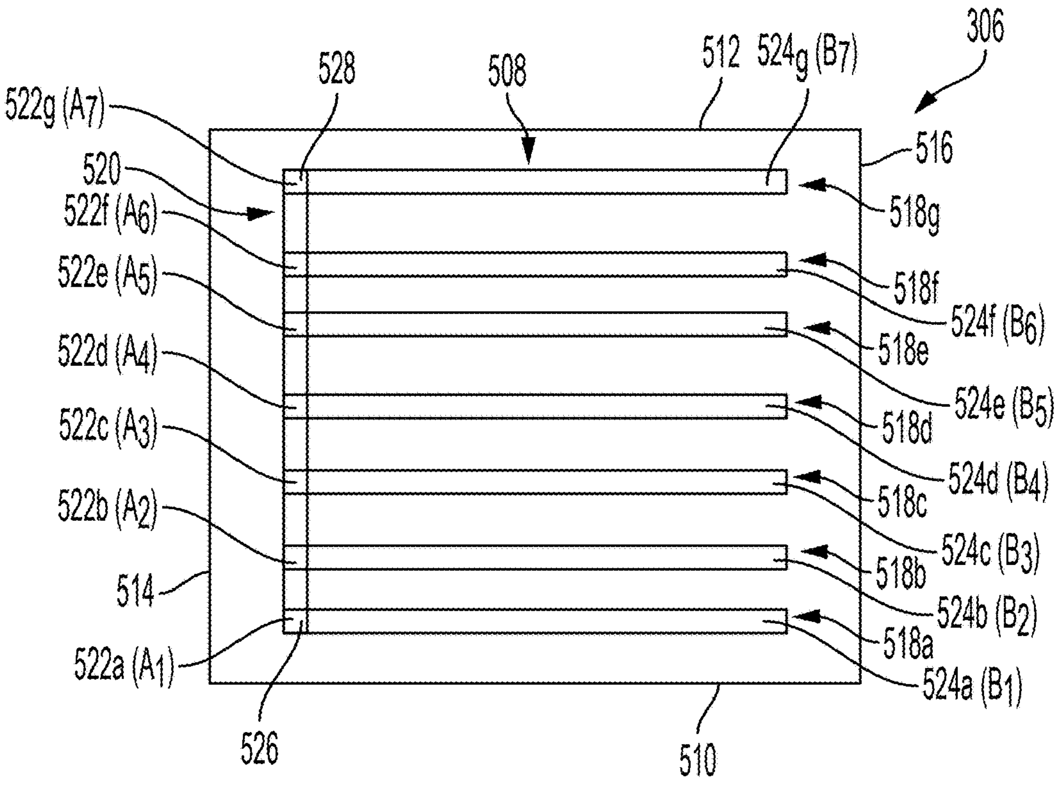
FIG. 5 is a first embodiment of a frame wall and track for use with the loading system of FIG. 3, according to at least one aspect of the present disclosure.

FIG. 5 is a schematic view of an example first track 508 for use with the loading system 300 of FIG. 3, according to at least one aspect of the present disclosure. As illustrated, the first track 508 may be provided on the first frame wall 306 of the frame 302 (FIGS. 3 and 4). While related to the first track 508 provided on the first frame wall 306, the present discussion is equally applicable to a second track (not shown) provided on the second frame wall 308 (FIGS. 3 and 4), without departing from the scope of the disclosure.

As illustrated, the first frame wall 306 includes a bottom edge 510, a top edge 512 opposite the bottom edge 510, a first lateral edge 514, and a second lateral edge 516 opposite the first lateral edge 514. The first lateral edge 514 may be positioned adjacent the rear end 132 (FIGS. 1, 2, and 4) of the hose bed 120, and the second lateral edge 516 may be positioned adjacent the front wall 122 (FIGS. 1, 2, and 4) of the hose bed 120.

The first track 508 comprises a plurality of horizontal tracks 518*a-g* and a vertical track 520 extending through and interconnecting each of the horizontal tracks 518*a-g*. Each horizontal track 518*a-g* includes a rearward horizontal end 522*a-g* adjacent the first lateral edge 514 and a forward horizontal end 524*a-g* adjacent the second lateral edge 516. The vertical track 520 includes a lower vertical end 526 at the lower-most horizontal track 518*a* and an upper vertical end 528 at the upper-most horizontal track 518*g*. While the present embodiment is shown and described as having seven horizontal tracks 518*a-g* and one vertical track 520, other embodiments are envisioned that include more or less than seven horizontal tracks and more than one vertical track.

In one aspect, as seen in FIG. 5, the vertical track 520 extends through (interests) the rearward horizontal ends 522*a-g* of each horizontal track 518*a-g*. In another aspect, the vertical track 520 may alternatively extend through the forward horizontal end 524*a-g* of each horizontal track 518*a-g*. In yet another aspect, the vertical track 520 may extend through (intersect) the horizontal tracks 518*a-g* at a position between the rearward horizontal ends 522*a-g* and the forward horizontal ends 524*a-g*.

The first track 508 defines a loading path that extends through each of the horizontal tracks 518*a-g* and the vertical track 520. Specifically, as shown in FIG. 5, the loading path begins at the rearward horizontal end 522*a* of the lower-most horizontal track 518*a* at a starting, first position $A_1$. The loading path extends from the first position $A_1$ along the length of the lower-most horizontal track 518*a* to the forward horizontal end 524*a* at a second position $B_1$. In one aspect, movement along the loading path from a rearward position, such as the first position $A_1$, to a forward position, such as the second position $B_1$, is a referred to as a "loading stroke". The loading path then extends from the second position $B_1$ along the length of the lower-most horizontal track 518*a* back to the first position $A_1$. In one aspect, movement along the loading path from a forward position, such as the second position $B_1$, to a rearward position, such as the first position $A_1$, is a referred to as a "return stroke".

The loading path then extends from the first position $A_1$ along a first segment of the vertical track 520 to the rearward horizontal end 522*b* of the horizontal track 518*b* above the lower-most horizontal track 518*a* at a third position $A_2$. In one aspect, vertical movement along the loading path from a rearward position, such as the first position $A_1$, to a second rearward position, such as the third position $A_2$, is referred to as a "vertical shifting stroke".

The loading path along the first track 508 may then continue from the rearward horizontal track end 522*b* at position $A_2$ to a forward horizontal track end 524*b* at position $B_2$ (i.e., a loading stroke path), back to the rearward horizontal position $A_2$ (i.e., a return stroke path), then vertically to the rearward horizontal track end 522*c* at an elevated rearward horizontal position $A_3$ (i.e., a vertical shifting stroke path). This loading path pattern continues along this pattern until it reaches the upper-most horizontal track 518*g* in which the loading path extends from an upper-most rearward horizontal track end 522*g* at position $A_7$ to the forward, ending horizontal track end 522*g* at position $B_7$.

Figure 6:
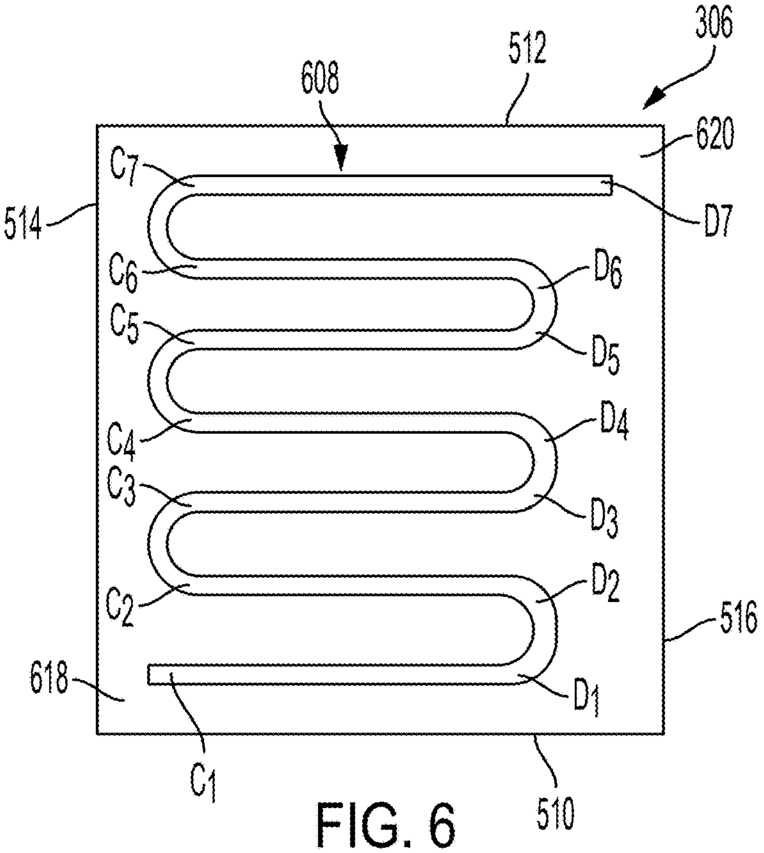
FIG. 6 is a second embodiment of a frame wall and track for use with the loading system of FIG. 3, according to at least one aspect of the present disclosure.

FIG. 6 is a schematic view of another example first track 608 for use with the loading system 300 of FIG. 3, according to at least one aspect of the present disclosure. Similar to the first track 508 of FIG. 5, the first track 608 may be provided on the first frame wall 306 of the frame 302 (FIGS. 3 and 4). While related to the first track 608 provided on the first frame wall 306, the present discussion is equally applicable to a second track (not shown) provided on the opposite second frame wall 308 (FIGS. 3 and 4), without departing from the scope of the disclosure.

As illustrated, the first frame wall 306 includes the bottom edge 510, the top edge 512, the first lateral edge 514 positioned adjacent the rear end 132 (FIGS. 1, 2, and 4) of the hose bed 120 (FIGS. 1, 2, and 4), and the second lateral edge 516 positioned adjacent the front wall 122 (FIGS. 1, 2, and 4) of the hose bed 120. Unlike the first track 508 of FIG. 5, however, the first track 608 comprises a continuous track that defines a serpentine loading path that extends from a lower rearward corner 618 of the first frame wall 306 at a starting, first rearward position $C_1$ to an upper forward corner 620 of the first frame wall 306 at an ending, upper-most forward position $D_N$.

More specifically, the loading path begins at the starting, first rearward position $C_1$. The loading path then extends from the first rearward position $C_1$ to a first, forward end of the continuous track at a first forward position $D_1$. In one aspect, like the embodiment provided in FIG. 5, movement along the loading path from a rearward position (e.g., the first rearward position $C_1$) to a forward position (e.g., the first forward position $D_1$) is a referred to as a "loading stroke".

The loading path then extends from the first forward position $D_1$ to an elevated second forward position $D_2$ of the continuous track. Movement along the loading path from a first position (e.g., the first forward position $D_1$) to an elevated position (e.g., the second forward position $D_2$) is referred to as a "vertical shifting stroke".

The loading path then extends from the second forward position $D_2$ to a second rearward position $C_2$ of the continuous track. Movement along the loading path from a forward position (e.g., the second forward position $D_2$) to a rearward position (e.g., the second rearward position $C_2$) is a referred to as a "return stroke". The loading path then extends from the second rearward position $C_2$ to an elevated third rearward position $C_3$ of the continuous track, in a second vertical shifting stroke.

The loading path then extends along the continuous track in a manner like what was described above. For example, the loading path then extends from the third rearward position $C_3$ to a third forward position $D_3$ (i.e., a loading stroke path), vertically from the third forward position $D_3$ to a fourth forward position $D_4$ (i.e., a third vertical shifting stroke path), back from the fourth forward position $D_4$ to a fourth rearward position $C_4$ (i.e., a return stroke path), then vertically from a fourth rearward position $C_4$ to an elevated fifth rearward $C_5$ (i.e., a fifth vertical shifting stroke path). This loading path pattern continues until it reaches the upper-most rearward position $C_7$ in which the loading path then extends from the upper-most rearward position $C_7$ to the ending, upper-most forward position $D_7$. While the present embodiment is shown and described as having seven rearward and seven forward positions, other embodiments are envisioned in which the continuous track has more or less than seven rearward/forward positions.

Referring again to FIGS. 3 and 4, with continued reference to FIGS. 5 and 6, example operation the loading system 300 will now be provided. The loading system 300 may be operable to perform a loading procedure in which a firehose 200 (FIG. 2) is automatically loaded into the frame 302 without the need for a firefighter to climb up onto the firetruck 100 (FIG. 1). More specifically, a user, such as a firefighter, can initiate a loading procedure by placing (manipulating) the arm 322 of the hose catch 318 to the open position and loading a section (e.g., an end) of the firehose 200 into the opening 330 between the first and second stops 326, 328 of the body 320. In one aspect, the user manually moves the arm 322 to the open position. In another aspect, the user provides an input to an input interface, which provides an input to the computer system 332 to move the arm 322 to the open position using the arm drive system. In one aspect, the input interface comprises a touchscreen computer in communication with the computer system. In one aspect, the input interface comprises a switch in communication with the computer system. In one aspect, the input interface comprises a depressible button in communication with the computer system.

With the section of hose loaded into the hose catch 318, the user may then manually transition the hose catch 318 to the gripping state, thereby gripping the firehose 200 (FIG. 2) within the hose catch 318. In other embodiments, however, the user may provide an input into the input interface to cause the computer system 332 to transition the hose catch 318 to the gripping state.

With a section of the firehose 200 (FIG. 2) secured within the hose catch 328, the user may provide an input to the input interface to execute the loading procedure. In one aspect, the input is provided to the computer system 332 to initiate the loading procedure. In one aspect, the loading procedure is an algorithm stored in the memory of the computer system 332 and executable by the computer system 332 based on the user provided input.

During the loading procedure, the computer system 332 causes the first end 314 of the rail 312 to traverse the first track (e.g., the first tracks 508 or 608 of FIGS. 5 and 6, respectively) provided on the first frame wall 306, and the second end 314 of the rail 312 to traverse an opposing the second track (i.e., a mirror image of the first tracks 508 or 608) provided on the opposing second frame wall 308, and thereby moving the loading track 310 along a loading path. In one aspect, the loading path is stored in the memory and is retrievable by the computer system 332.

During the loading procedure, the computer system 332 may control the hose catch 318 to move the arm 322 between the gripping state, where the arm 322 grippingly engages the hose to move a section of hose within the frame 302, and an released state, where the arm 322 is disengaged from the hose to allow the hose catch 318 to move relative to the hose. In one aspect, the computer system 332 moves the arm 322 between the released and gripping states based on a position of the loading track 310 along the loading path. In one aspect, the various rearward and forward positions along the loading path (i.e., $A_1$, $A_2$, $B_1$, $B_2$, $C_1$, $C_2$, $D_1$, $D_2$, etc.) are stored in the memory and the computer system moves the arm 322 between the released state and the gripping state based on the ends 314, 316 of the rail 312 reaching these positions. In one aspect, the loading system 300 further includes limit switches in communication with the computer system 332 and that are positioned at the various rearward and forward positions along the loading path (i.e., $A_1$, $A_2$, $B_1$, $B_2$, $C_1$, $C_2$, $D_1$, $D_2$, etc.). The computer system 332 controls a position of the arm 322 based on the ends 314, 316 of the rail 312 actuating the limit switches.

A first example implementation of the loading system 300 will now be described in connection with the first frame wall 306 and the first track 508 provided in FIG. 5. A user initiates the loading procedure using the input interface, causing the arm 322 to engage a section of hose positioned within the opening 330 and otherwise between the body 320 and the arm 322. The computer system 332 then causes the first end 314 of the rail 312 to move along the lower-most horizontal track 518*a* from the first position $A_1$ to the second position $B_1$ (a loading stroke), causing a section of hose to be laid onto (deposited in) the frame base 304. Based on the first end 314 reaching the second position $B_1$, the computer system 332 may be programmed to move the arm 322 to the released state, causing the arm 322 to release the section of hose, while the section of hose is maintained within the opening 330 between the first stop 326 and the second stop 328. The computer system 332 then moves the first end 314 along the lower-most horizontal track 518*a* from the second position $B_1$ to the first position $A_1$ (a return stroke) and vertically from the first position $A_1$ to the third position $A_2$ (a shifting stroke). Based on the first end 314 reaching the third position $A_2$, the computer system 332 moves the arm 322 to the gripping state, causing the arm 322 to re-engage and grippingly contact the section of hose. The computer system 332 then repeats the above-described cycle along the remaining horizontal tracks 518*b-g* and vertical track 520 to load additional sections of hose on top of the first section of hose until the first end 314 reaches the forward, ending horizontal track position $B_7$.

A second example implementation of the loading system 300 will now be described in connection with the first frame wall 306 and the first track 608 provided in FIG. 6. A user initiates the loading procedure using the input interface, causing the arm 322 to engage a section of hose positioned within the opening 330 and otherwise between the body 320 and the arm 322. The computer system 332 then causes the first end of the rail 314 to move along the continuous track from the first position $C_1$ to the second position $D_1$ (a loading stroke), causing a section of hose to be laid onto the frame base 304. Based on the first end 314 reaching the second position $D_1$, the computer system 332 moves the arm 322 to the released state, causing the arm 322 to release the section of hose, while the section of hose is maintained within the opening 330 between the first stop 326 and the second stop 328. The computer system 332 then moves the first end 314 along the continuous path from the second position $D_1$ to the third position $D_2$ (a shifting stroke), from the third position $D_2$ to the fourth position $C_2$ (a return stroke), and then from the fourth position $C_2$ to the fifth position $C_3$. Based on the first end 314 of the loading track 310 reaching the fifth position $C_3$, the computer system 332 moves the arm 322 to the gripping state, causing the arm 322 to re-engage the section of hose. The computer system 332 then repeats the above-described cycle to load additional sections of hose on top of the first section of hose until the first end 314 reaches the ending, upper-most forward position $D_7$.

For the above-described first and second implementations, it should be understood that, once the computer system 332 reaches the end of the tracks of the respective frame walls 306, 308, the computer system 332 can return the loading track 310 to its starting position of the tracks (i.e., $A_1$ and $C_1$) and the hose catch 318 can be moved laterally along the rail 312 (e.g., between the frame walls 306, 308) to another lateral loading position to load additional hoses into the frame 302.

A third example implementation of the loading system 300 will now be described in connection with the first frame wall 306 and the first track 508 provided in FIG. 5. A user positions a section of firehose 200 into the opening 330 of the catch 318 and then manually moves the arm 322 to the gripping state. The user then initiates the loading procedure using the input interface. The computer system 332 then causes the first end 314 of the rail 312 to move along the lower-most horizontal track 518*a* from the first position $A_1$ to the second position $B_1$ (a loading stroke), causing a section of hose to be laid onto (deposited in) the frame base 304. Based on the first end 314 reaching the second position $B_1$, the computer system 332 may be programmed to move the arm 322 to the released state, causing the arm 322 to release the section of hose, while the section of hose is maintained within the opening 330 between the first stop 326 and the second stop 328.

Figure 7:
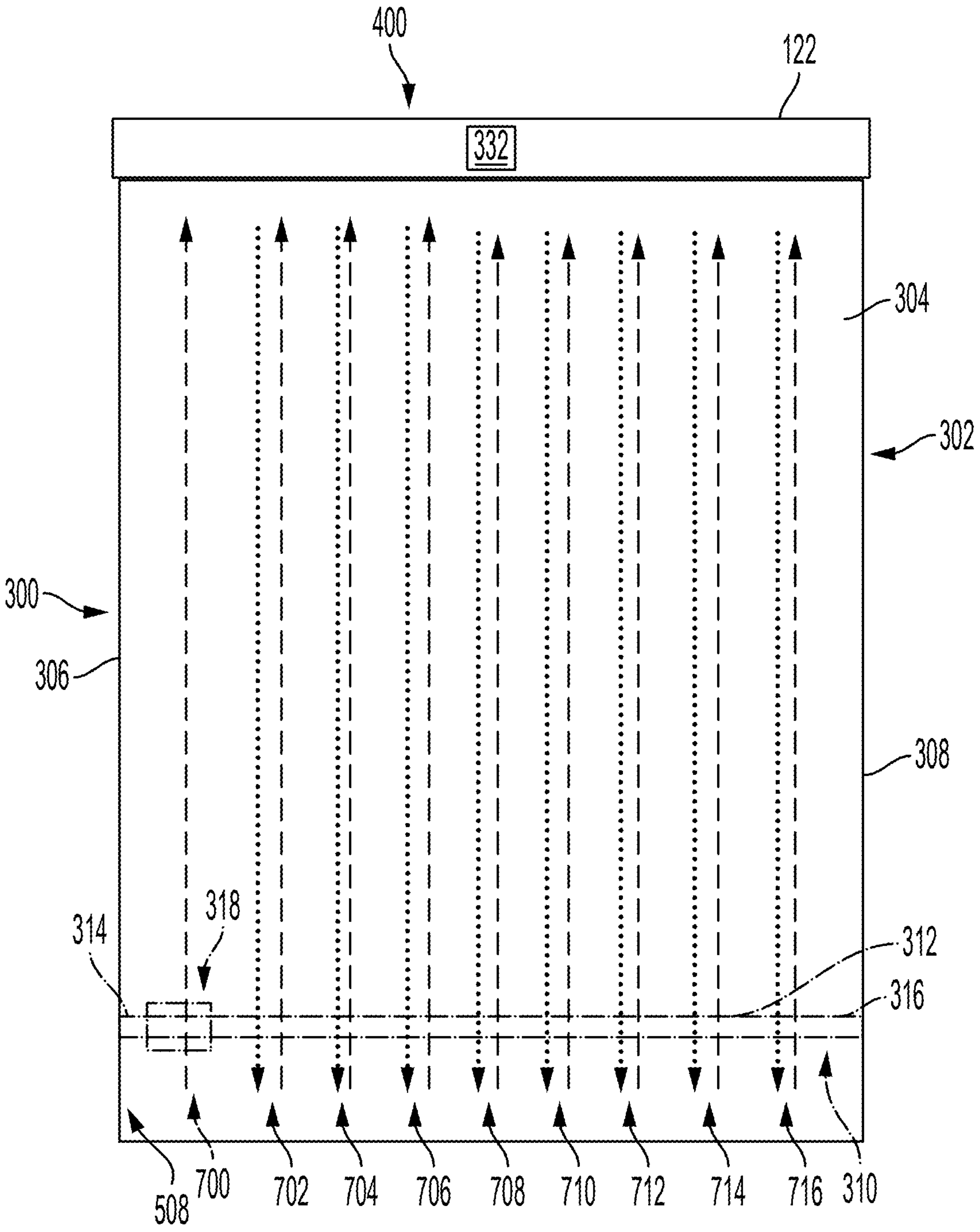
FIG. 7 is another example implementation of the loading system of FIG. 3 using the frame wall of FIG. 5, according to at least one aspect of the present disclosure.

Referring now to FIG. 7, the computer system 332 then moves catch 318 laterally along the rail 312 from a first lateral loading position 700 (similar to what is shown in FIGS. 3 and 4) to a second lateral loading position 702 (a shifting stroke). In the second lateral loading position 702, the computer system 332 then moves the first end 314 along the lower-most horizontal track 518*a* from the second position $B_1$ to the first position $A_1$ (a return stroke). Based on the first end 314 returning to the first position $A_1$, now being in the second lateral loading position 702, the computer system 332 moves the arm 322 to the gripping state, causing the arm 322 to re-engage and grippingly contact the section of firehose 200. The computer system 332 then repeats the above-described cycle along the same horizontal track 518*a* at a plurality of lateral loading positions 704, 706, 708, 710, 712, 714, 716 to load (deposit) additional sections of hose within the frame 302 (along the frame base 304). Once the computer system 332 has moved the catch 318 along the horizontal track 518*a* at the final lateral loading position 716, the computer system 332 can then move the first end 314 along the vertical track 520 to the second horizontal track 518*b* and repeat the above-described cycle to lay additional firehose 200 on top of the firehose laid on the frame base 304, only now moving laterally from the final lateral loading position 716 toward the first lateral loading position 700.

For the above-described first, second, and third example implementations, it should be understood that, while the computer system 332 drives the first end 314 of the rail 312 through the first track, the computer system 332 similarly drives the second end 316 of the rail 312 through the second track of the second frame wall 308, which is a mirror image of the first track of the first frame wall 306. Accordingly, the computer system 332 operates to co-operatively move the first end 314 of the rail 312 through the first track and the second end 316 of the rail 312 through the second track to move the loading track 310 and interconnected hose catch 318 along the loading path.

In one aspect, the hose catch 318 further comprises a sensor in communication with the computer system 332 to detect a hose coupling contacting the hose catch 318 as the loading track moves through a return stroke or a shifting stroke. Based on the detected contact, the computer system 332 terminates the loading procedure.

The use of directional terms such as above, below, upper, lower, upward, downward, left, right, forward, rearward, and the like are used in relation to the illustrative embodiments as they are depicted in the figures, the upward direction being toward the top of the corresponding figure and the downward direction being toward the bottom of the corresponding figure, the rearward direction being toward the rear end of the firetruck 100, such as toward the rear end 132 of the hose bed 120, and the forward direction being toward the front of the firetruck 100, such as toward the front wall 122 of the hose bed 120 and the cab of the firetruck 100.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 8. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 8:
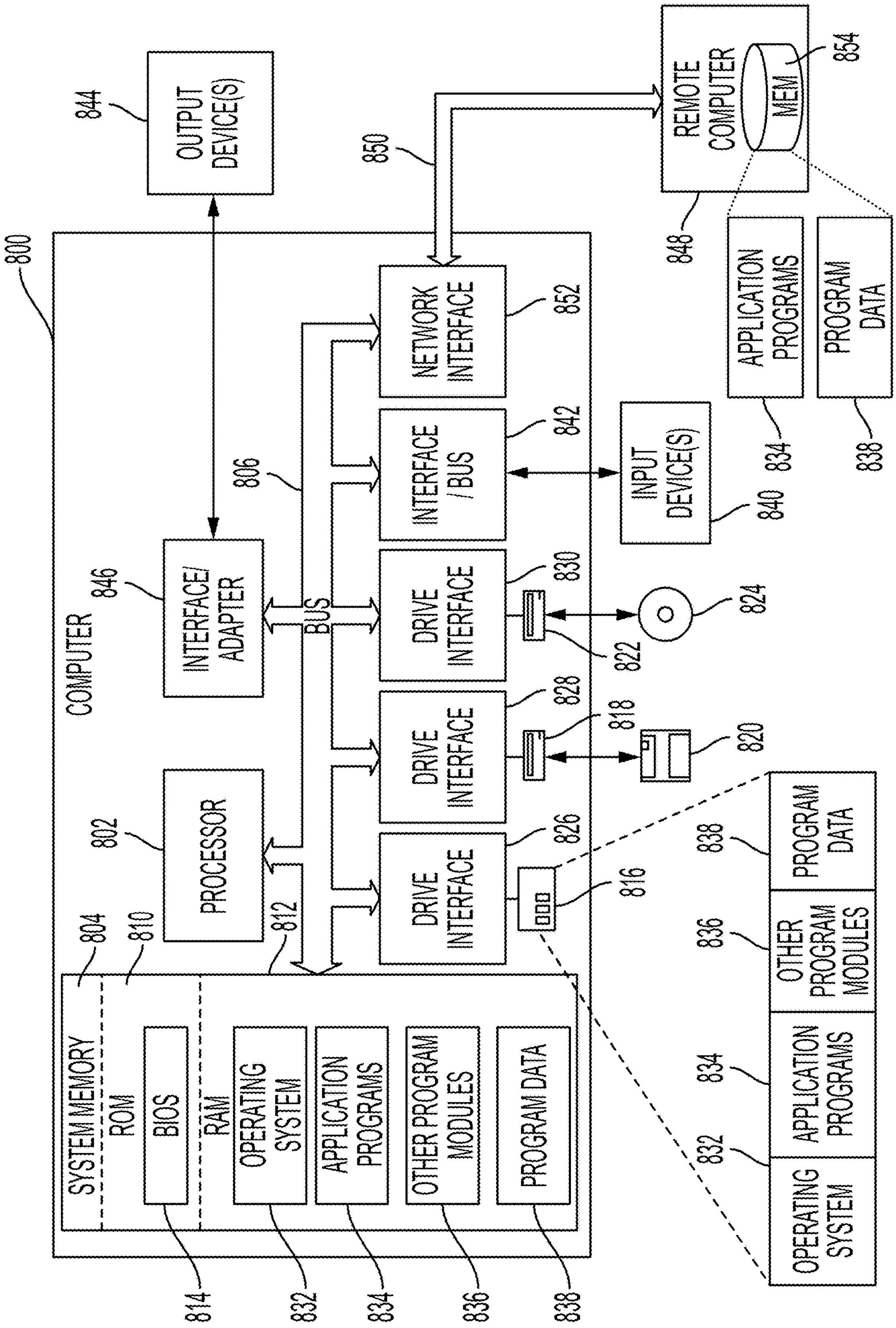
FIG. 8 is a computer system for use with the loading system of FIG. 3, according to at least one aspect of the present disclosure.

In this regard, FIG. 8 illustrates one example of a computer system 800 that can be employed to execute one or more embodiments of the present disclosure. Computer system 800 can be implemented on one or more general purpose networked computer systems, embedded computer systems, routers, switches, server devices, client devices, various intermediate devices/nodes or standalone computer systems. Additionally, computer system 800 can be implemented on various mobile clients such as, for example, a personal digital assistant (PDA), laptop computer, pager, and the like, provided it includes sufficient processing capabilities.

Computer system 800 includes processing unit 802, system memory 804, and system bus 806 that couples various system components, including the system memory 804, to processing unit 802. Dual microprocessors and other multi-processor architectures also can be used as processing unit 802. System bus 806 may be any of several types of bus structure including a memory bus or memory controller, a peripheral bus, and a local bus using any of a variety of bus architectures. System memory 804 includes read only memory (ROM) 810 and random access memory (RAM) 812. A basic input/output system (BIOS) 814 can reside in ROM 810 containing the basic routines that help to transfer information among elements within computer system 800.

Computer system 800 can include a hard disk drive 816, magnetic disk drive 818, e.g., to read from or write to removable disk 820, and an optical disk drive 822, e.g., for reading CD-ROM disk 824 or to read from or write to other optical media. Hard disk drive 816, magnetic disk drive 818, and optical disk drive 822 are connected to system bus 806 by a hard disk drive interface 826, a magnetic disk drive interface 828, and an optical drive interface 830, respectively. The drives and associated computer-readable media provide nonvolatile storage of data, data structures, and computer-executable instructions for computer system 800. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 810, including operating system 832, one or more application programs 834, other program modules 836, and program data 838. The application programs 834 and program data 838 can include functions and methods programmed to carry out the loading procedure for loading firehoses into the frame of the loading system, such as shown and described herein.

A user may enter commands and information into computer system 800 through one or more input devices 840, such as a pointing device (e.g., a mouse, touch screen), keyboard, microphone, joystick, game pad, scanner, and the like. For instance, the user can employ input device 840 to initiate a loading procedure in which the loading system loads firehoses into the frame thereof. These and other input devices 840 are often connected to processing unit 802 through a corresponding port interface 842 that is coupled to the system bus, but may be connected by other interfaces, such as a parallel port, serial port, or universal serial bus (USB). One or more output devices 844 (e.g., display, a monitor, printer, projector, or other type of displaying device) is also connected to system bus 806 via interface 846, such as a video adapter.

Computer system 800 may operate in a networked environment using logical connections to one or more remote computers, such as remote computer 848. Remote computer 848 may be a workstation, computer system, router, peer device, or other common network node, and typically includes many or all the elements described relative to computer system 800. The logical connections, schematically indicated at 850, can include a local area network (LAN) and a wide area network (WAN). When used in a LAN networking environment, computer system 800 can be connected to the local network through a network interface or adapter 852. When used in a WAN networking environment, computer system 800 can include a modem, or can be connected to a communications server on the LAN. The modem, which may be internal or external, can be connected to system bus 806 via an appropriate port interface. In a networked environment, application programs 834 or program data 838 depicted relative to computer system 300, or portions thereof, may be stored in a remote memory storage device 854.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A loading system, comprising:

a frame mountable to a hose bed of a firetruck and including a track;

a rail movable along the track; and a hose catch operatively coupled to the rail and comprising:

a body; and an arm pivotably attached to the body and transitionable between a gripping state, where the arm grippingly engages a firehose and thereby enables the hose catch to move the firehose within the frame, and a released state, where the arm releases the firehose and thereby enables the hose catch to move relative to the firehose, wherein the hose bed includes a front wall, a rear end opposite the front wall, and opposing first and second lateral bed walls extending between the front wall and the rear end, the loading system further comprising:

a first frame wall arranged adjacent to the first lateral bed wall and extending between the rear end and the front wall; and a second frame wall arranged adjacent to the second lateral bed wall and extending between the rear end and the front wall;

wherein the track comprises:

a first track on the first frame wall; and a second track on the second frame wall, a first end of the rail being received within the first track and a second end of the rail being received within the second track.

2. The loading system of claim 1, wherein the first and second tracks each include a plurality of horizontal tracks and a vertical track interconnecting each horizontal track.

3. The loading system of claim 1, wherein the rail is movable along the first and second tracks between a rearward position and a forward position.

4. The loading system of claim 3, wherein the forward position is vertically offset from the rearward position.

5. A loading system, comprising:

a frame mountable to a hose bed of a firetruck and including a track;

a rail movable along the track; and a hose catch operatively coupled to the rail and comprising:

a body; and an arm pivotably attached to the body and transitionable between a gripping state, where the arm grippingly engages a firehose and thereby enables the hose catch to move the firehose within the frame, and a released state, where the arm releases the firehose and thereby enables the hose catch to move relative to the firehose, wherein the hose catch provides an opening sized to receive the firehouse, and wherein the arm is pivotable between the release state, where the arm is rotated away from the body and allows the firehose to be received in the opening, and the gripping state, where the arm is rotated toward the body and thereby captures the firehose within the opening.

6. The loading system of claim 1, wherein the hose catch is movable along the rail.

7. The loading system of claim 1, further comprising a computer system to move the rail and the hose catch through:

a loading stroke in which the arm is in the gripping state and the rail is moved toward a forward position; and a return stroke in which the arm is in the released state and the rail is moved toward a rearward position.

8. The loading system of claim 7, wherein the hose catch is movable along the rail from a first position to a second position laterally offset from the first position, and wherein the computer system is to further move the hose catch from the first position to the second position based on the rail moving through the loading stroke.

9. A loading system, comprising:

a frame mountable to a hose bed of a firetruck and including a track;

a rail movable along the track and comprising a hose catch, configurable between:

a gripping state in which the hose catch grippingly engages a firehose and thereby enables the hose catch to move the firehose within the frame; and a released state in which the arm releases the firehose and thereby enables the hose catch to move relative to the firehose;

wherein the rail is movable along the track through:

loading strokes in which the hose catch is in the gripping state; and return strokes in which the hose catch is in the released state.

10. The loading system of claim 9, wherein the hose bed includes a front wall, a rear end opposite the front wall, and opposing first and second lateral bed walls extending between the front wall and the rear end, the loading system further comprising:

a first frame wall to confront the first lateral bed wall; and a second frame wall to confront the second lateral bed wall;

wherein the track comprises:

a first track provided on the first frame wall; and a second track provided on the second frame wall, a first end of the loading track being received within the first track and a second end of the loading track being received within the second track.

11. The loading system of claim 10, wherein the first and second tracks each include a plurality of horizontal tracks and a vertical track interconnecting each horizontal track.

12. The loading system of claim 10, wherein the rail extends between the first frame wall and the second frame wall, and wherein the hose catch is movable along the rail.

13. The loading system of claim 12, wherein the hose catch is movable along the rail from a first position to a second position laterally offset from the first position, and wherein the hose catch is movable from the first position to the second position based on the rail moving through a loading stroke of the loading strokes.

14. The loading system of claim 10, further comprising a computer system to automatically move the loading track through the loading strokes and the return strokes.

15. The loading system of claim 5, wherein the hose catch is movable along the rail.

16. The loading system of claim 5, further comprising a computer system to move the rail and the hose catch through:

a loading stroke in which the arm is in the gripping state and the rail is moved toward a forward position; and a return stroke in which the arm is in the released state and the rail is moved toward a rearward position.

17. The loading system of claim 16, wherein the hose catch is movable along the rail from a first position to a second position laterally offset from the first position, and wherein the computer system is to further move the hose catch from the first position to the second position based on the rail moving through the loading stroke.

18. The loading system of claim 5, wherein the hose bed includes a front wall, a rear end opposite the front wall, and opposing first and second lateral bed walls extending between the front wall and the rear end, the loading system further comprising:

a first frame wall arranged adjacent to the first lateral bed wall and extending between the rear end and the front wall; and a second frame wall arranged adjacent to the second lateral bed wall and extending between the rear end and the front wall;

wherein the track comprises:

a first track on the first frame wall; and a second track on the second frame wall, a first end of the rail being received within the first track and a second end of the rail being received within the second track.

19. The loading system of claim 18, wherein the first and second tracks each include a plurality of horizontal tracks and a vertical track interconnecting each horizontal track.

20. The loading system of claim 18, wherein the rail is movable along the first and second tracks between a rearward position and a forward position, wherein the forward position is vertically offset from the rearward position.

* * * * *